United States Patent [19]

Kato et al.

[11] 4,181,876

[45] Jan. 1, 1980

[54] SPEED CONTROL CIRCUIT FOR ELECTRIC MOTORS

[76] Inventors: Kenji Kato, No. 7-1, 9-chome, Kawabe-machi, Oume-shi, Tokyo; Haruhiko Tanaka, No. 2-8, 4-chome, Kamirenjaku, Mitaka-shi, Tokyo, both of Japan

[21] Appl. No.: 877,350

[22] Filed: Feb. 13, 1978

[30] Foreign Application Priority Data

Feb. 17, 1977 [JP] Japan ............................ 52-127289

[51] Int. Cl.² .............................................. H02P 5/16
[52] U.S. Cl. ........................... 318/345 G; 318/345 H
[58] Field of Search ........ 318/345 C, 345 CT, 345 H, 318/331, 345 R; 307/252 P, 252 Q, 252 T

[56] References Cited

U.S. PATENT DOCUMENTS

| | | | |
|---|---|---|---|
| 3,177,418 | 4/1965 | Meng | 318/331 |
| 3,214,667 | 10/1965 | Foster et al. | 318/345 C |
| 3,518,520 | 6/1970 | Molnar | 318/331 |

*Primary Examiner*—David Smith, Jr.
*Attorney, Agent, or Firm*—Michael J. Striker

[57] ABSTRACT

The speed control circuit comprises a full wave rectifier having its output connected to an adjustable D.C. voltage divider. A series circuit connected to an A.C. power source includes an electric motor and an anti-parallel connection of two thyristors. The gates of the thyristors are connected to the output of the voltage divider via separate trigger circuits each providing a different trigger voltage proportional to the setting of the voltage divider. In this manner one or both thyristors may be selectively activated and the electric motor can be driven with half the waves as well as with full waves of the power source.

6 Claims, 4 Drawing Figures

SPEED CONTROL CIRCUIT FOR ELECTRIC MOTORS

BACKGROUND OF THE INVENTION

This invention relates generally to a speed control circuit for electromotors and, more specifically it relates to a control circuit using thyristors for controlling a single phase series wound commutator motor. The circuit provides the control of phases of an A.C. power source so that the motor can be selectively energized by half waves as well as full waves of the power source.

A half wave phase control circuit with a thyristor as shown in FIG. 1 is well known as an electric circuit for controlling the speed of a single phase series wound commutator motor. In FIG. 1 (AC) is an alternate power source, (M) is a single phase series commutator motor, and (SCR1) is a thyristor connected in series to the motor for speed control thereof. Namely the phases of the AC power source are controlled by the thyristor to be supplied to the motor. Resistor (R1), variable resistor (V.R) capacitor (C1) and diode (D1) compose, as shown, a reference voltage generating circuit to supply a trigger current to the thyristor (SCR1). The reference voltage generating circuit is connected to the gate terminal (G1) of the thyristor (SCR1) via diode (D2) and wiper (M.C) which is operated by the user to take out a divided voltage from the reference voltage generating circuit. Resistor (R2) and capacitor (C2) are provided to protect the gate terminal (G1) of the thyristor (SCR1). When the voltage is applied to the thyristor (SCR1) in the normal direction thereof, a voltage (E1) is generated in the variable resistor (V.R) in the direction indicated by the arrow mark between the diode (D1) and the contacting point of the wiper (M.C) and the variable resistor (V.R), and the voltage can be variably adjusted by shifting the wiper on the variable resistor. On the other hand, when the motor (M) is driven a counter electromotive voltage (E2) is generated in the motor in proportion to the rotation speed of the motor and in the direction opposite to the direction of the voltages (E1). The counter electromotive force (E2) in the inconductive period of the thyristor (SCR1) is based on the residual magnetism which has been excited in the preceding conductive period of the thyristor. Therefore, the trigger voltage (E1-E2) is applied to the gate terminal (G1) of the thyristor (SCR1), and the thyristor is ignited when the trigger voltage reaches the ignition voltage in accordance with the waves of the power source.

If the load increases and the rotation speed of the motor lowers, the counter electromotive force (E2) decreases and the trigger voltage (E1-E2) increases to advance the ignition phase, and thus the motor torque increases. Namely the feed back effect can be obtained. However, the electric circuit in FIG. 1 is of a half wave phase control system, and cannot apply full voltage to the motor (M). Therefore the electric motor designed to be driven in a high speed with application of the full voltage can be well controlled by this half wave phase control circuit, but a high speed can not be obtained. In order to obtain a high speed of such motor by use of this control circuit, the motor must be specifically re-designed so that they may be driven with a high speed by this half wave phase control circuit. Otherwise the thyristor (SCR1) in the control circuit may be short-circuited by a separate switch when desired to drive the motor at a high speed. But such specifically re-designed motor would be not suited for the full voltage performance, and also the motors become bulky. The short-circuited thyristor (SCR1), on the other hand, will not provide a desired control of the motor because such thyristor will make a sudden acceleration of the motor from the medium speed to the high speed. Moreover a considerably complex connection mechanism must be provided between the separate switch and the wiper (M.C), and also a care must be taken to protect the thyristor (SCR1) from the surge voltage caused at the same time of opening and closing the switch.

The object of the present invention is to eliminate the defects and disadvantages of the prior art, and to control the single phase series commutator motor in all ranges from the low speed to the high speed.

SUMMARY OF THE INVENTION

In keeping with these objects, and others which will become apparent hereafter, one feature of the invention resides, in a speed control circuit, in a combination which comprises terminals connectable to an A.C. power source, a full wave rectifier connected to the terminals for producing at its output a D.C. full wave voltage; an adjustable voltage divider connected to the D.C. voltage output to provide at its output an adjustable D.C. reference voltage, a series circuit connected to the A.C. terminals and including an electric motor and two antiparallel connected thyristors, and two trigger circuits connected respectively to the gates of the thyristors and to the reference voltage output, the trigger circuits applying to each thyristor a different trigger voltage adjustable by the voltage divider. Preferably, the voltage divider includes a potentiometer having its contact point connected to the trigger circuit. Each trigger circuit includes a diode and one of the trigger circuits has a series connected resistor to reduce the trigger sensitivity of the assigned thyristor.

The novel features which are considered as characteristic for the invention are set forth in particular in the appended claims. The invention itself, however, both as to its constructions and its method of operation, together with additional objects and advantages thereof, will be best understood from the following description of specific embodiments when read in connection with the accompanying drawing.

DESCRIPTION OF THE PREFERRED EMBODIMENTS

Figure 1:
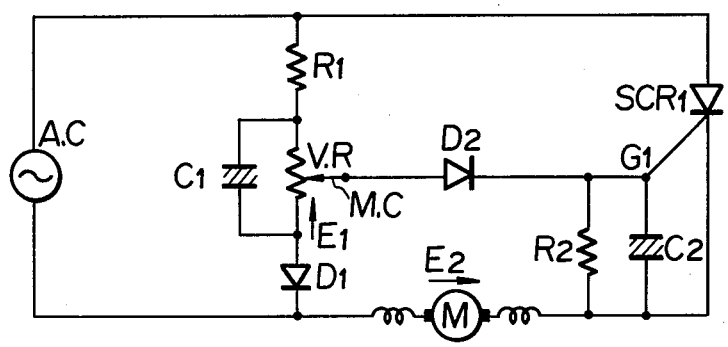
FIG. 1 is the conventional speed control circuit for an electric motor.
Figure 2:
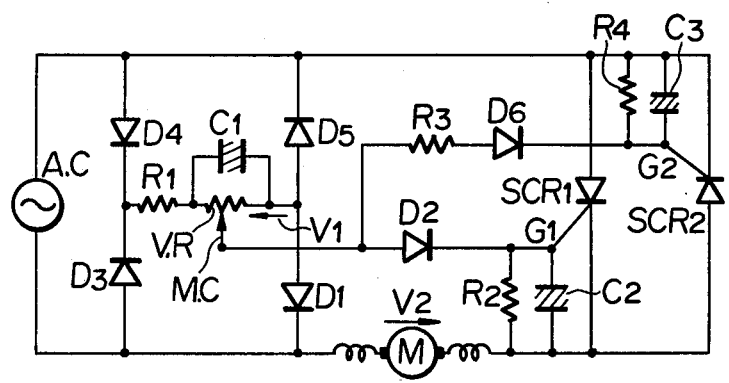
FIG. 2 is a speed control circuit for an electric motor showing a first embodiment of this invention.

In reference to FIG. 2 showing an electric motor control circuit of this invention which is based on the prior art as shown in FIG. 1, a thyristor (SCR1) and a thyristor (SCR2) are connected in parallel in the inverted condition to each other, so that the thyristor (SCR1) may control the half wave phases from the low speed to the medium speed of the motor, and so that the thyristor (SCR2) may additionally control the opposite half wave phases from the medium speed to the high speed of the motor. The thyristors (SCR1) (SCR2) are connected to attain the full wave phase control of the AC power source. (D1), (D3), (D4), (D5) are diodes provided to rectify all waves of the source voltage so as to make effective the reference voltage curcuit in all periods of the source voltage. As the result, the voltage (V1) generated between the variable resistor (V.R) and the diode (D1) or (D5) becomes the full wave rectified voltage in the direction indicated by the arrow mark, in contrast to the corresponding voltage (E1) in FIG. 1 being the half wave voltage.

The thyristor (SCR2) has the gate terminal (G2) connected to the wiper (M.C) through a resistor (R3) and a diode (D6). The resistor (R3) decreases the sensitivity of thyristor (SCR2) in comparison to the thyristor (SCR1) having the gate terminal (G1) directly connected to the wiper (M.C.). The protective resistor (R4), which is of a value smaller than that of the resistor (R2), additionally decreases the sensitivity of the thyristor (SCR2). Thus in this control circuit in FIG. 2, the thyristor (SCR2) is so arranged as to be ignited after the ignition phase of the thyristor (SCR1) has advanced to some extent as the wiper (M.C) is shifted. (C3) is a gate protection capacitor for the thyristor (SCR2) as is the capacitor (C2) for the thyristor (SCR1).

In FIG. 2, if the wiper (M.C) is shifted in the leftward direction to a certain extent, only the thyristor (SCR1) is ignited. In this case, the counter electromotive force (V2) generated in the electric motor (M) is identical with that (E2) in FIG. 1 in the value and in the direction. Therefore in this control range, thyristor (SCR1) is in an ignited condition only while the trigger voltage (V1-V2) is applied thereto as is the case in FIG. 1, and the speed control fo the motor is performed with the same feedback effect with that of the prior art in FIG. 1.

As the wiper (M.C) is further shifted in the leftward direction, the thyristor (SCR2) is ignited in addition to the operation of the thyristor (SCR1) while the source voltage of the operative polarity is applied to the thyristor, and the electric motor (M) is driven by the asymmetrical alternate current. Concerning the trigger voltage (V1-V2) of the thyristor (SCR1) in this control range, as the motor (M) is energized by the current flowing through the thyristor (SCR2) while the thyristor (SCR1) is inconductive, the counter electromotive force (V2) is acting in the direction opposite to the direction indicated by the arrow mark, and the feedback effect of the motor is lost. On the other hand, concerning the thyristor (SCR2), as the motor (M) is not located in the circuit through which the gate current of the thyristor (SCR2) flows, the trigger voltage becomes only the difference between the voltage (V1) and the trigger voltage reduced due to the resistor (R3), and the feedback effect can not be obtained as well. However, it is to be noted that the feedback effect is not needed in this control range (from medium to high speed) because the rotation of the motor is stabilized by the inertia of load.

Figure 3:
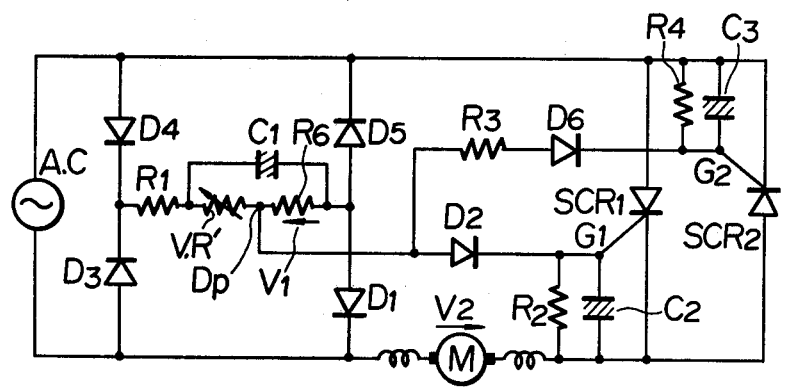
FIG. 3 is a speed control circuit for an electric motor showing a second embodiment of this invention.

FIG. 3 shows another embodiment of this invention, in which the combination of the variable resistor (V.R) and the wiper (M.C) in FIG. 2 is replaced by a combination of a variable resistor (V.R'), a resistor (R6) and a voltage dividing junction (DP). The voltage dividing junction (DP) is connected to the junction between the variable resistor (VR') and the resistor (R6) as shown to very the divided voltage through adjustment of the variable resistor (VR'). This replacement of elements can be applied to the embodiment in FIG. 4 of this invention.

Figure 4:
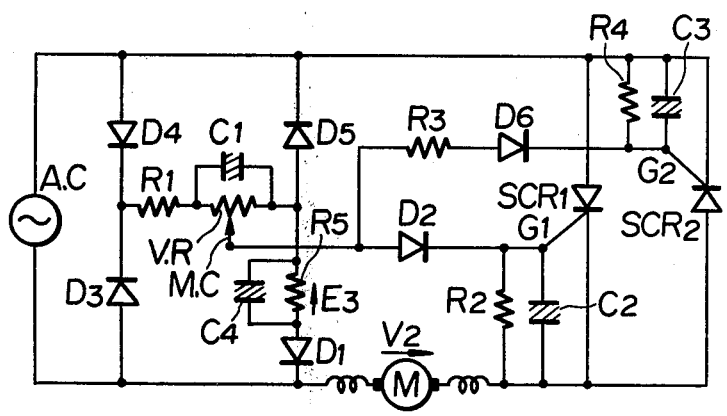
FIG. 4 is a speed control circuit for an electric motor showing a third embodiment of this invention.

FIG. 4 shows another embodiment of this invention, in which a resistor (R5) and a capacitor (C4) are additionally provided in parallel between the diode (D1) and the junction of the variable resistor (VR) and the diode (D5) in FIG. 2.

In contrast to the embodiment in FIG. 2 having a reference voltage circuit common to the thyristor (SCR1) and thyristor (SCR2), FIG. 4 shows the embodiment in which the reference voltage circuit becoms effective as in the case of FIG. 2 while the source voltage is applied to the thyristor (SCR2) in the normal direction thereof. While the source voltage is applied to the thyristor (SCR1) in the normal direction thereof, the reference voltage circuit becomes effective together with the parallel circuit of the resistor (R5) and the capacitor (C4). At the starting time of the motor (M) when the wiper (M.C) has been shifted to the right end of the variable resistor (V.R), the gate terminal (G1) of the thyristor (SCR1) is supplied with a trigger voltage (E3-V2) in relation to the D.C voltage (E3) which is generated on both sides of the resistor (R5), while no trigger voltage is applied to the gate terminal (G2) of the thyristor (SCR) because the voltage (V1) is zero. If the motor (M) is started to be driven with the lowest speed at this instant, the unnecessary motion or stroke of the wiper (M.C) can be eliminated, so as not to give unnecessary driving electric current to the motor (M). At the same time, with further improvement of the sensitivity for biasing the operation time of the thyristors (SCR1), (SCR2), and with the utilization of the property providing a lower constant speed control of the motor (M) with the voltage (V1), the control circuit can be applied, for example, to a sewing machine which is selectively required to intermittently operate to make intermittent or basting stitches.

We claim:

1. A speed control circuit for a single phase series wound commutator motor, comprising: two A.C. terminals connectable to an A.C. power source; a full wave rectifier connected to said A.C. terminals for producing at its output a D.C. full wave voltage; an adjustable voltage divider connected to said D.C. voltage output for providing on its output an adjustable D.C. reference voltage; a series circuit connected to said A.C. terminals and including an electric motor and two antiparallel connected thyristors; and two trigger circuits connected respectively to the gates of said thyristors and to said reference voltage output, said trigger circuits applying to each thyristor a different trigger voltage adjustable by said voltage divider.

2. A speed control circuit as defined in claim 1 wherein said voltage divider includes a potentiometer having its contact point connected to said trigger circuits.

3. A speed control circuit as defined in claim 1, wherein said voltage divider includes a series connected fixed resistor and an adjustable resistor, said trigger circuits being connected to the junction point between said resistors.

4. A speed control circuit as defined in claim 2, further including a parallel connection of a resistor and a capacitor connected in a branch of said rectifier and in series with said voltage divider.

5. A speed control circuit as defined in claim 1 wherein each trigger circuit includes a diode and one of the trigger circuits includes a resistor connected in series with said diode.

6. A speed control circuit as defined in claim 5 wherein the gate of each thyristor is grounded through a parallel connection of a resistor and a capacitor.

* * * * *